US009584510B2

(12) United States Patent
Stuntebeck et al.

(10) Patent No.: US 9,584,510 B2
(45) Date of Patent: Feb. 28, 2017

(54) IMAGE CAPTURE CHALLENGE ACCESS

(71) Applicant: AirWatch LLC, Atlanta, GA (US)

(72) Inventors: Erich Stuntebeck, Marietta, GA (US); Chen Lu, Sandy Springs, GA (US); Kar Fai Tse, Peachtree Corners, GA (US)

(73) Assignee: AirWatch LLC, Atlanta, GA (US)

( * ) Notice: Subject to any disclaimer, the term of this patent is extended or adjusted under 35 U.S.C. 154(b) by 18 days.

(21) Appl. No.: 14/501,713

(22) Filed: Sep. 30, 2014

(65) Prior Publication Data
US 2016/0094547 A1    Mar. 31, 2016

(51) Int. Cl.
| H04L 29/06 | (2006.01) |
| G06K 9/00 | (2006.01) |
| G06K 9/20 | (2006.01) |
| G06F 21/62 | (2013.01) |
| G06F 21/32 | (2013.01) |

(52) U.S. Cl.
CPC ...... H04L 63/0861 (2013.01); G06K 9/00281 (2013.01); G06K 9/2081 (2013.01); G06F 21/32 (2013.01); G06F 21/6218 (2013.01)

(58) Field of Classification Search
None
See application file for complete search history.

(56) References Cited

U.S. PATENT DOCUMENTS

| 9,147,061 B1 * | 9/2015 | McClendon | G06F 21/32 |
| 2002/0136435 A1 * | 9/2002 | Prokoski | G06K 9/00221 |
| | | | 382/118 |
| 2007/0122007 A1 * | 5/2007 | Austin | G06K 9/00221 |
| | | | 382/118 |
| 2008/0247607 A1 * | 10/2008 | Amano | G06K 9/00885 |
| | | | 382/115 |
| 2013/0015946 A1 * | 1/2013 | Lau | G07C 9/00 |
| | | | 340/5.2 |
| 2013/0086674 A1 * | 4/2013 | Horvitz | G06F 21/32 |
| | | | 726/19 |
| 2014/0184748 A1 * | 7/2014 | Gharib | G06T 7/0069 |
| | | | 348/46 |
| 2014/0230046 A1 * | 8/2014 | Dewan | G06K 9/00288 |
| | | | 726/19 |
| 2015/0063026 A1 * | 3/2015 | Koudele | G11C 16/28 |
| | | | 365/185.11 |
| 2016/0062456 A1 * | 3/2016 | Wang | G06F 21/32 |
| | | | 382/117 |

* cited by examiner

*Primary Examiner* — Dao Ho
*Assistant Examiner* — Andrew Steinle

(57) ABSTRACT

Aspects of image capture challenge access are described. In one embodiment, an access service of a computing device directs an imaging system to capture an image including facial fiducial features and determine whether the features correspond to an expected set of features. The access service may also issue a request for a response including, for example, a request to tilt or move the computing device, move an individual's face, or contort an individual's facial features. After the request for the response, the access service may capture a response image. The response image may include an adjustment to facial fiducial features. The access service may further determine whether the adjustment to the facial fiducial features corresponds to the request. Depending upon whether the adjustment corresponds to the request, the access service may permit or deny access to features of the computing device.

20 Claims, 8 Drawing Sheets

IMAGE CAPTURE CHALLENGE ACCESS

BACKGROUND

In various computing systems and devices, access control is often relied upon to prevent unauthorized access to sensitive data and services. Different types of access control may rely upon passwords, software or hardware keys, biometric keys, multi-factor authentication, etc. It should be appreciated, however, that certain types of access control may not be suitable for use with certain computing systems and devices. For example, different types of access control may be more or less susceptible to attack and circumvention, comparatively. Thus, for securing especially sensitive data, a weak type of access control may be unsuitable. Meanwhile, from a usability standpoint, certain types of access control may be more or less difficult and/or frustrating for a user to use. Generally, it is necessary to select an appropriate type of access control based upon a balance of the type of computing system or device being protected, the expectations of the user, and the consequences of access control circumvention, among other factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As described above, access control is often relied upon to prevent unauthorized access to sensitive data and services. Generally, it is necessary to select an appropriate type or form of access control based upon a balance of the type of computing system or device being protected, the expectations of the user, and the consequences of access control circumvention, among other factors. Facial recognition may be relied upon, at least in part, as one manner of access control. However, it is noted that some facial recognition access control techniques may be circumvented by merely presenting a photograph of an individual authorized for access. That is, some facial recognition techniques cannot reliably distinguish between an authorized individual and a photograph of the authorized individual. This presents a particular problem in that access control by facial recognition may be circumvented using photographs or other display of an authorized individual.

In the context outlined above, aspects of image capture challenge access are described herein. In one embodiment, an access service of a computing device directs an imaging system to capture an image including facial fiducial features and determine whether the features correspond to an expected set of features. The access service may also issue a request for a response including, for example, a request to tilt or move the computing device, move an individual's face, or contort an individual's facial features. After the request for the response, the access service may capture a response image. The response image may include an adjustment to facial fiducial features. The access service may further determine whether the adjustment to the facial fiducial features corresponds to the request. Depending upon whether the adjustment corresponds to the request, the access service may permit or deny access to features of the computing device. Further, to the extent necessary for robust access control, a series of requests may be presented to the individual, and the access service may analyze a response image for each request in the series until an adequate level of confidence in identification of the individual is confirmed. Using the techniques of image capture challenge access described herein, it may be possible to more reliably distinguish between an authorized individual and a photograph of the authorized individual, preventing the circumvention of facial recognition using photographs, for example.

In the following paragraphs, a general description of a representative system and its components is provided, followed by a discussion of the operation of the same.

Figure 1:
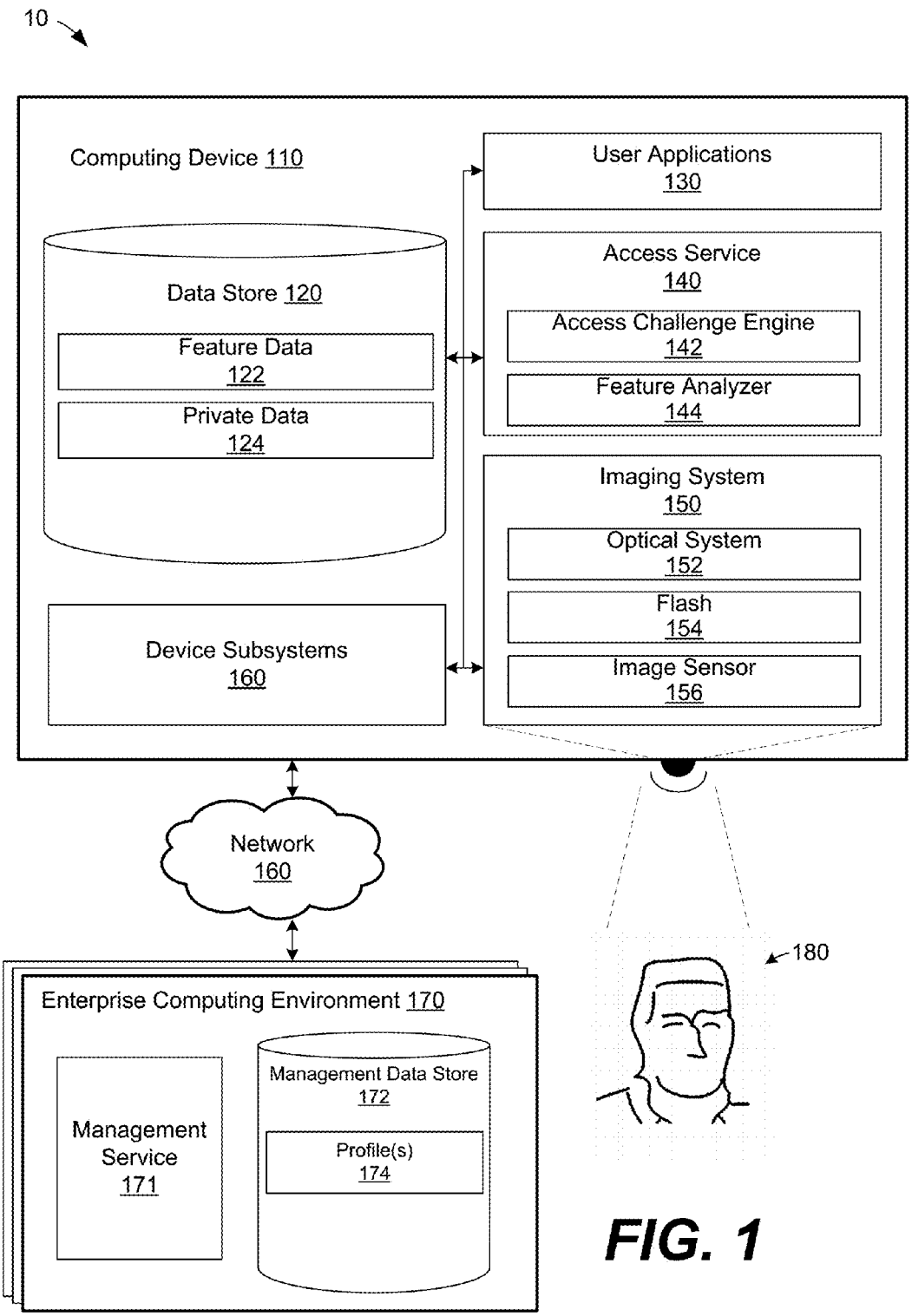
FIG. 1 illustrates a networked computing environment for image capture challenge access according to various embodiments described herein.

FIG. 1 illustrates a networked computing environment 10 for image capture challenge access according to various embodiments described herein. The networked environment 10 includes a computing device 110, a network 160, and a computing environment 170. It is noted that one or more of the elements or devices illustrated in FIG. 1 may be omitted in certain embodiments. For example, the network 160 and the computing environment 170 may be omitted in certain embodiments.

The computing device 110 is representative of any processor-based device or apparatus, including but not limited to a desktop computer, a laptop computer, a personal digital assistant, a wearable computing device, a cellular telephone, a camera, a handheld gaming device, a set-top box, a music or media player, a tablet computer, etc. As illustrated in FIG. 1, the computing device 110 may include an information integration data store 120, user applications 130, an access service 140, an imaging system 150, and device subsystems 160, each of which is further described below.

Depending upon its primary purpose or function, the device subsystems 160 may include various subsystems or components, such as but not limited to input subsystems, output subsystems, display subsystems, data communications subsystems, positioning or orientation subsystems, etc. The input subsystems may include keyboards, keypads, touch pads, touch screens, microphones, cameras, buttons, switches, sensors, global navigation satellite system (GNSS), etc. The output and display subsystems may include speakers, ringers, buzzers, haptic feedback systems, display screens, indicator lights, etc. The data communications subsystems may include cellular, infra-red, IEEE 802.11-based WI-FI, Bluetooth®, or any other suitable or desirable data communications system or variant thereof. The positioning or orientation subsystems may include accelerometers, gyroscopes, etc., depending upon the primary purpose or function of the computing device 110. In part, the computing device 110 may be embodied as functional and/or logic elements (e.g., application-specific or general computing circuitry, processing circuitry, computer-readable instructions, or any combination thereof) that adapt, configure, or direct the computing device 110 to perform aspects of the embodiments described herein.

The enterprise computing environment 170 may be embodied as a computer, computing device, or computing system. In certain embodiments, the enterprise computing environment 170 may include one or more computing devices arranged, for example, in one or more server or computer banks. The computing device or devices may be located at a single installation site or distributed among different geographical locations. The enterprise computing environment 170 may include a plurality of computing devices that together embody a hosted computing resource, a grid computing resource, and/or other distributed computing arrangement. In some cases, the enterprise computing environment 170 may be embodied as an elastic computing resource where an allotted capacity of processing, network, storage, or other computing-related resources varies over time. In part, the enterprise computing environment 170 may be embodied as a virtual or virtualized computing environment. In general aspects of the embodiments, the computing device 110 may rely upon the enterprise computing environment 170 for processing or storing data. For example, to the extent necessary in certain embodiments, the access service 140 may be performed or executed, at least in part, in the enterprise computing environment 170. Further, the feature data 122 may be stored, at least in part, in a data store of the enterprise computing environment 170.

In other aspects of the embodiments, the enterprise computing environment 170 may be relied upon as a management service of the computing device 110 and/or other devices similar to the computing device 110. In this context, the enterprise computing environment 170 includes a management service 171 and a management data store 172. The management data store 172 includes one or more profiles 174. The management service 171 may be configured to control operating aspects of the computing device 110 with reference to the data stored in the profiles 174.

The profiles 174 may contain profile, configuration, or compliance data and/or rules for one or more individuals (e.g., users of the computing device 110) or groups of individuals (e.g., employees of certain business units, etc.), for example. The profiles 174 may store data related to enabling or disabling authorization mechanisms or certain features of the computing device 110. The configuration data of the profiles 174 may include decryption keys that are unlocked (or made available) in the event that an individual passes the authorization mechanism presented by the access service 140 as described herein. The credentials of the profiles 174 may include username, password, and/or token data which may be unlocked (or made available) for access to features protected by the access service 140, in the event that an individual passes the authorization mechanism. The compliance rules of the profiles 174 may include rules that define the enforcement of certain remedial actions in the event that that an individual fails the authorization mechanism after a threshold number of attempts.

On the basis of the data stored in the profiles 174, the management service 171 may be configured to control, direct, or modify one or more features or functions of the computing device 110. Similarly, on the basis of the data stored in the profiles 174, the management service 171 may control, direct, or modify one or more resources available to the computing device 110. In this context, the resources available to the computing device 110 may include applications, processing capability, network connectivity, etc. As another example, the management service 171 may be configured to enable or disable the access service 140 or configure operating parameters or characteristics of the access service 140.

With regard to configuring operating parameters of the access service 140, the management service 171 may be configured to specify the type of image capture challenge access executed or performed by the access service 140. In other words, the management service 171 may be configured to specify whether the access service 140 relies upon a request for a response, an adjustment the optical system 152, or a combination thereof, as described herein, when conducting image capture challenge access. Further, the management service 171 may be configured to specify or control the order in which requests are made by the access service 140 during image capture challenge access, the number of requests made by the access service 140 during image capture challenge access, the manner of adjustment of an attribute of image capture made by the access service 140 during image capture challenge access, etc. Thus, by way of control of operating aspects of the access service 140, the management service 171 may be configured to control the manner in which access control to the computing device 110 is achieved.

The network 160 may include the Internet, intranets, extranets, wide area networks (WANs), local area networks (LANs), wired networks, wireless networks, cable networks, satellite networks, other suitable networks, or any combinations thereof. It is noted that the computing device 110 may communicate with other network elements, including but not limited to the computing environment 170, using various protocols, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or any other suitable protocol for communicating data over the network 160, without limitation. It is noted that the network 160 may include connections to any number and type of network host, such as website servers, file servers, cloud computing resources, databases, data stores, or any other network or computing architectures.

In the computing device 110, the user applications 130 are representative of various applications executing on the computing device 110. When the computing device 110 is embodied as a cellular telephone or tablet, for example, the user applications 130 may include a contacts application, a dialing application, a short messaging service (SMS) application, an Internet browser, an e-mail application, etc.

The access service 140 includes an access challenge engine 142 and a feature analyzer 144. As described below in greater detail, the access service 140 may be relied upon to prevent unauthorized access to the computing device 110 using one or more images captured by the imaging system 150. The imaging system 150 includes an optical system 152, a flash 154, and an image sensor 156. The optical system 152 may include one or more lenses and autofocus systems, the flash 154 may include any suitable device that provides light for capturing images in darker settings, for example, and the image sensor 156 may include any suitable image capture sensor for capturing digital photographs or images. It is noted that the imaging system 150 may include several optical systems 152, flashes 154, and image sensors 156 on various sides (e.g., front, back, etc.) of the computing device 110. In some cases, the image sensor 156 may be embodied as an infrared image sensor or a thermal image sensor. The infrared image sensor may capture images including an indication of a source of infrared energy, and the thermal image sensor may capture images including an indication of a source of heat. In either case, the identification of the source of infrared energy or heat may be relied upon to identify or determine whether an individual was present during image capture, for example, as opposed to only a photograph of the individual.

Using the user applications 130, a user 180 of the computing device 110 may access private or confidential data through the network 160. Further, the user 180 of the computing device 110 may store private or confidential data as the private data 124. Similarly, using the imaging system 150, the user 180 of the computing device 110 may capture images that are private or confidential. It should be appreciated that the user 180 of the computing device 110 may access, generate, and store the private data 124 using the computing device 110 in various ways and for various purposes. This private data 124 may include contact lists, e-mail, personal or business documents or files, photographs, etc. Generally, the private data 124 may include any data that the user 180 wishes to prevent unauthorized access to.

The user 180 of the computing device 110 may wish to prevent access to the data network 160, the private data 124, the user applications 130, and other features of the computing device 110 by unauthorized individuals. As discussed above, various forms of access control may rely upon passwords, software or hardware keys, biometric keys, multi-factor authentication, etc. In the context of image capture challenge access described herein, before full access to the features of the computing device 110 is permitted, the computing device 110 is configured to identify and verify that the user 180 is authorized to access the computing device 110. In certain aspects of the embodiments, the computing device 110 is configured to identify and verify the user 180 with reference to one or more images of the user 180. Thus, as further described below, the access service 140 may operate with the imaging system 150 to capture images of the user 180 and verify that the user 180 is authorized to access the computing device 110.

Generally, according to the direction of the access service 140, the computing device 110 is configured to capture an image including facial fiducial features and determine whether the facial fiducial features correspond to an expected set of features. In this context, facial fiducial features may include facial features of an individual, such as the individual's chin, nose, eyes, eyebrows, skin coloring, eye coloring, hair coloring, etc., any combination thereof, relative positions thereof (e.g., the center-to-center distance of the individual's pupils), or relative differences or similarities therebetween. In one embodiment, based on whether the facial fiducial features correspond to the expected set of features, the computing device 110 is further configured to issue a request for a response. The request for a response may include a request to tilt or move the computing device 110 up or down, a request to move an individual's face up or down, or a request to move or contort an individual's facial features in a certain way, for example. After making the request for the response, the computing device 110 is configured to capture a response image. Due in part to the request for the response, the response image may include an adjustment to the facial fiducial features. Using the response image as a secondary reference image for facial recognition, the computing device 110 is further configured to determine whether the adjustment to the facial fiducial features corresponds to the request. Based on whether the adjustment to the facial fiducial features corresponds to the request, the computing device 110 is further configured to permit or deny access to a feature or application of the computing device 110.

Next, a more detailed description of the operation of the computing device 110 and, more particularly, the access challenge engine 142 and the feature analyzer 144 of the access service 140 is provided with reference to FIGS. 2-7.

Figure 2:
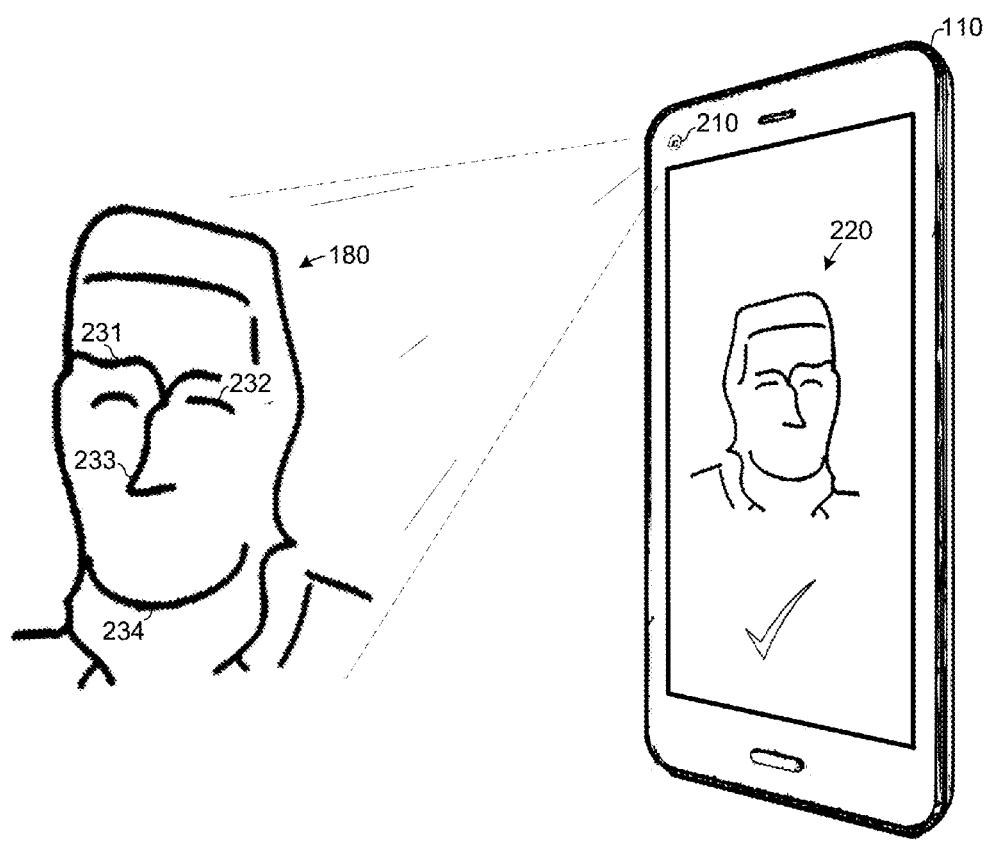
FIG. 2 illustrates an example image including facial fiducial features captured using the computing device in FIG. 1 according to aspects of the embodiments described herein.

FIG. 2 illustrates an example image 220 including facial fiducial features captured using the computing device 110 in FIG. 1 according to aspects of the embodiments described herein. In FIG. 2, the computing device 110 is illustrated as a cellular telephone, although it should be appreciated that the computing device 110 may be embodied as other types of devices. The computing device 110 includes a front-facing camera 210 as part of the imaging system 150. When the user 180 wants to access the features and functions of the computing device 110, the access challenge engine 142 of the access service 140 may direct the computing device 110 (e.g., the imaging system 150) to capture an image 220 (e.g., a "still image") of the user 180 including facial fiducial features using an image capture sensor of the front-facing camera 210. In the example illustrated in FIG. 2, the facial fiducial features of the user 180 include an eyebrow 231, eye 232, nose 233, and chin 234, for example, although other facial fiducial features are within the scope of the embodiments. As further discussed below, as part of a process of image capture challenge access, the access challenge engine 142 may direct the imaging system 150 to capture one or more images, video, or video and audio of the user 180 including the facial fiducial features. Among embodiments, the images may be captured slowly or rapidly over time, between requests for responses, as part of sequence of images in a video, etc. Generally, the capture and comparison of two or more of the images is relied upon for image capture recognition or challenge access.

With reference to the image 220, the feature analyzer 144 is configured to determine whether the facial fiducial features 231-234 correspond to an expected set of features for the user 180. More particularly, the feature analyzer 144 may compare the facial fiducial features 231-234 with an expected set of features for the user 180, as stored in the feature data 122. In this context, it is noted that data representative of the expected set of features for the user 180 may be captured (e.g., trained) by the computing device 110 and stored as the feature data 122 during a facial recognition training period.

It is noted that the access service 140 may capture the image 220 of the user 180 without making any particular request for a response from the user 180, as further described below, as a preliminary stage of facial recognition. Based on whether the facial fiducial features in the image 220 correspond to the expected set of features stored in the feature data 122, as determined by the feature analyzer 144, the access control service 140 may issue a request for a response from the user 180. In various embodiments, the request for a response may include a request for the user 180 to tilt or move the computing device 110 up or down, a request for the user 180 to move his or her face up or down relative to the computing device 110, or a request for the user 180 to move or contort his or her facial features in a certain way, for example, among other requests. In other aspects of the embodiments, the access control service 140 may be configured to adjust an attribute of image capture and capture an adjusted image after the attribute of image capture is adjusted. In this context, the adjusted attribute of image capture may include focus depth, flash activity, flash intensity, or broad light activity, broad light intensity, or broad light color provided from a display of the computing device 110, among other attributes.

Figure 3:
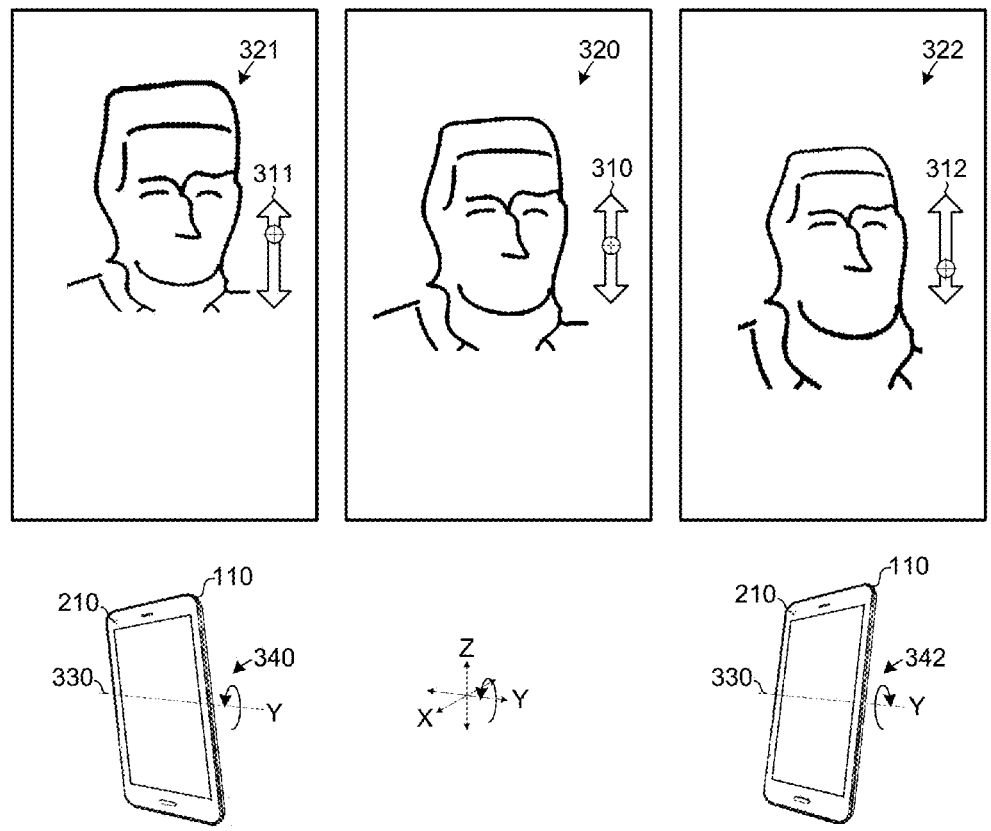
FIG. 3 illustrates example response images captured with adjusted facial fiducial features using the computing device in FIG. 1 according to aspects of the embodiments described herein.

Turning to FIG. 3, example response images 320-322 captured with adjusted facial fiducial features using the computing device 110 in FIG. 1 are illustrated. In FIG. 3, the center image 320 is similar to the image 220 in FIG. 2. In contrast, the left image 321 and the right image 322 are representative of response images and include at least one adjustment to the facial fiducial features of the user 180, as compared to those features in the center image 320, for example. FIG. 3 also illustrates requests for responses 310-312. The request for response 310 is representative of a request for the user 180 to hold the computing device 110 substantially horizontal and without tilt. To verify that the user 180 is holding the computing device 110 substantially horizontal, the access service 140 may reference feedback from one or more accelerometers, gyroscopes, etc. in the device subsystems 160 (FIG. 1), for example, to confirm the orientation of the computing device 110.

In contrast to the request for response 310, the request for response 311 is representative of a request for the user 180 to tilt or move the computing device 110 down or forward along the "Y" axis 330 (e.g., the direction of pitch), and the request for response 312 is representative of a request for the user 180 to tilt or move the computing device 110 up or backward along the "Y" axis 330 (e.g., the direction of pitch). Representative examples of tilting or moving the computing device 110 forward and backward are provided at references 340 and 342, respectively. Alternatively, the requests for responses 311 and 312 may be representative of a request for the user 180 to tilt or move his head down or up (e.g., the direction of pitch) while maintaining the orientation of the computing device 110. To verify that the user 180 is tilting or moving the computing device 110 forward or backward, the access service 140 may again reference feedback from one or more accelerometers, gyroscopes, etc. in the device subsystems 160, for example.

It should be appreciated that the requests for responses 310-312 in FIG. 3 are provided as representative examples only. The requests for responses 310-312 are representative of one type of human-perceptible request, but others may be used. While the requests for responses 310-312 are illustrated in FIG. 3 as having a certain form (e.g., vertical double arrows and crosshairs) and provided on a display screen of the computing device 110, other types of requests are within the scope of the embodiments. In other words, the requests for responses 310-312 may be displayed or provided to the user 180 using other representative shapes or designs, using text instructions, audibly, or using haptic feedback, among other ways. Generally, the requests for responses 310-312 direct the user 180 to capture one or more images having enhanced facial fiducial feature differentiation among the one or more images, as described herein. In this context, the requests for responses 310-312, if followed by the user 180, may result in a change in location of the facial fiducial features relative to the image sensor 156 of the computing device 110. Additionally or alternatively, the requests for responses 310-312, if followed by the user 180, may result in a change in the angle or shadowing of the facial fiducial features from a perspective of the image sensor 156.

After one of the requests for responses 311 or 312, for example, is provided to the user 180 using the display screen of the computing device 110, the access challenge engine 142 is configured to capture one or more of the response images 321 or 322 with the image sensor 156 of the imaging system 150 (FIG. 1). As compared to the image 220 in FIG. 1 (or the image 320 in FIG. 3), each of the response images 321 and 322 are expected to include an adjustment to the facial fiducial features of the user 180. In turn, the feature analyzer 144 is configured to determine whether the adjustment to the facial fiducial features corresponds to the request (i.e., corresponds to one of the requests for responses 311 or 312). More particularly, the feature analyzer 144 may compare the adjustment to the facial fiducial features of the user 180 in one of the response images 321 and 322 with a set of expected adjustments stored in the feature data 122 to determine whether the adjustment corresponds to the associated request for response 311 or 312. In this context, it is noted that data representative of one or more sets of expected adjustments corresponding, respectively, to certain requests for responses may be captured (e.g., trained) by the computing device 110 and stored as the feature data 122 during a facial recognition training period.

Here, it is noted that the response images 321 and 322 in FIG. 3 are representative and not drawn to scale, to proportion, or for accuracy in depicting adjustments to facial fiducial features. Instead, it should be appreciated that, based on the change in angle of the front-facing camera 210 when tilting or moving the computing device 110 forward and backward as provided at references 340 and 342, respectively, certain adjustments to or variations on the facial fiducial features of the user 180 will be captured in response images. As some examples, the adjustments may include one or more of a change in profile of at least one facial fiducial feature, a change in shadow of at least one facial fiducial feature, or a relative spatial change between at least two facial fiducial features. With regard to the change in profile of at least one facial fiducial feature, the change in profile may be related to a change in angle of image capture. For example, the change in profile may be attributed to a change in angle by which an image of a nose is captured (e.g., front vs. side of nose). A change in shadow may be attributed to a relative change in size or direction of a shadow between two pictures taken at different angles. Further, a relative spatial change between two or more facial fiducial features may also be attributed to a change in angle between two captured images. In some cases, certain facial fiducial features may be blocked or disappear entirely depending upon the angle at which the image is captured.

It is noted that the feature analyzer 144 is configured to distinguish between a photograph of an individual and the actual individual. Particularly, because a photograph of an individual is generally flat and has no depth, the feature analyzer 144 may distinguish between adjustments in facial fiducial features captured from a photograph as compared to adjustments to facial fiducial features captured from the actual individual. In various embodiments, the feature analyzer 144 may be configured to distinguish between a photograph of an individual and the actual individual with reference to feature data stored in the feature data 122 and/or based on a comparison of multiple response images. In certain aspects and embodiments, the feature analyzer 144 may be configured to compare a response image (or one or more pixels of the response image) captured by the image sensor 156 with a set of expected adjustments stored in the feature data 122 to determine whether the adjustments to facial fiducial features correspond to one or more requests. Additionally or alternatively, the feature analyzer 144 may be configured to compare two response images to determine whether differences among them correspond to an expected changed based on one or more requests for responses.

Figure 4:
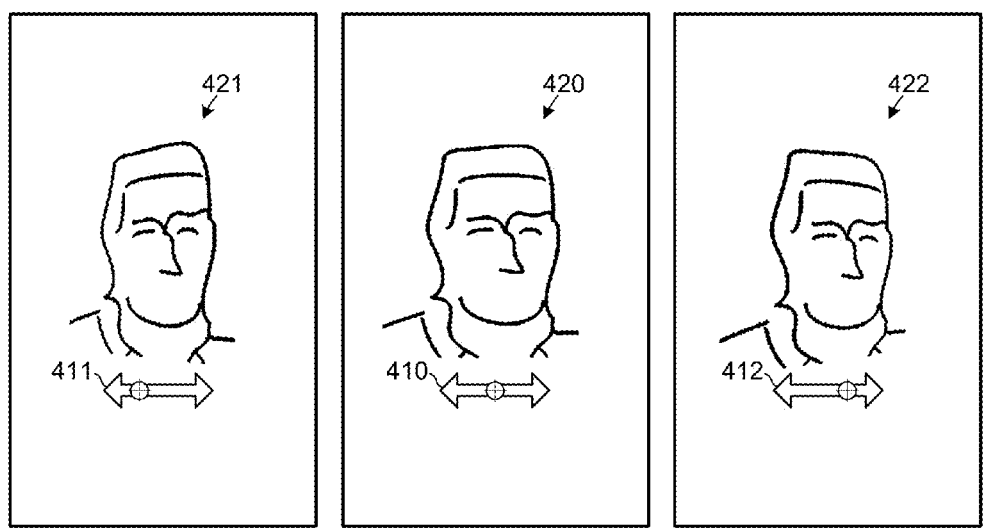
FIG. 4 illustrates other example response images captured with adjusted facial fiducial features using the computing device in FIG. 1 according to aspects of the embodiments described herein.
Figure 4:
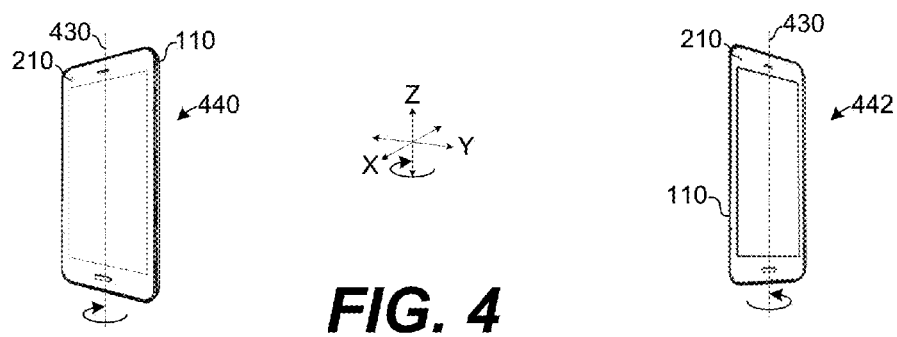

Turning to FIG. 4, other examples of response images 420-422 captured with adjusted facial fiducial features using the computing device 110 in FIG. 1 are illustrated. In FIG. 4, the center image 420 is similar to the image 220 in FIG. 2 and the image 320 in FIG. 3. In contrast, the left image 421 and the right image 422 are representative of response images and include at least one adjustment to the facial fiducial features of the user 180, as compared to those features in the center image 420, for example. FIG. 4 also illustrates requests for responses 410-412. The request for response 410 is representative of a request for the user 180 to hold the computing device 110 substantially horizontal and without tilt. Again, to verify that the user 180 is holding the computing device 110 substantially horizontal, the access service 140 may reference feedback from one or more accelerometers, gyroscopes, etc. in the device subsystems 160 (FIG. 1), for example, to confirm the orientation of the computing device 110.

In contrast to the request for response 410, the request for response 411 is representative of a request for the user 180 to turn the computing device 110 clockwise along the "Z" axis 430 (e.g., the direction of yaw), and the request for response 412 is representative of a request for the user 180 to turn the computing device 110 counterclockwise along the "Z" axis 430 (e.g., the direction of yaw). Representative examples of turning the computing device 110 clockwise and counterclockwise are provided at references 440 and 442, respectively. Alternatively, the requests for responses 411 and 412 may be representative of a request for the user 180 to tilt or move his head right or left (e.g., in the direction of yaw) while maintaining the orientation of the computing device 110.

It should be appreciated that the requests for responses 410-412 in FIG. 4 are provided as representative examples only. The requests for responses 410-412 are representative of one type of human-perceptible request, but others may be used. While the requests for responses 410-412 are illustrated in FIG. 4 as having a certain form (e.g., horizontal double arrows and crosshairs) and provided on a display screen of the computing device 110, other types of requests are within the scope of the embodiments. In other words, the responses 410-412 may be displayed or provided to the user 180 using other representative shapes or designs, using text instructions, audibly, or using haptic feedback, among other ways. Additionally, it is noted that other requests for responses may request the user 180 to tilt or move the computing device 110 or his head clockwise or counter-clockwise (e.g., in the "X" direction of roll).

After one of the requests for responses 411 or 412, for example, is provided to the user 180 using the display screen of the computing device 110, the access challenge engine 142 is configured to capture one or more of the response images 421 or 422 with the image sensor 156 of the imaging system 150 (FIG. 1). As compared to the image 220 in FIG. 1 (or the image 420 in FIG. 4), each of the response images 421 and 422 is expected to include an adjustment to the facial fiducial features of the user 180. In turn, the feature analyzer 144 is configured to determine whether the adjustment to the facial fiducial features corresponds to the request (i.e., corresponds to one of the requests for responses 411 or 412). More particularly, the feature analyzer 144 may compare the adjustment to the facial fiducial features of the user 180 in one of the response images 421 and 422 with a set of expected adjustments stored in the feature data 122 to determine whether the adjustment corresponds to one of the associated requests for responses 411 or 412. In this context, it is noted that data representative of one or more sets of expected adjustments corresponding, respectively, to certain requests for responses may be captured (e.g., trained) by the computing device 110 and stored as the feature data 122 during a facial recognition training period.

Here, it is noted that the response images 421 and 422 in FIG. 4 are representative and not drawn to scale, to proportion, or for accuracy in depicting adjustments to facial fiducial features. Instead, it should be appreciated that, based on the change in angle of the front-facing camera 210 when turning the computing device 110 clockwise or counter-clockwise as provided at references 440 and 442, respectively, certain adjustments to or variations on the facial fiducial features of the user 180 will be captured in response images. As some examples, the adjustments may include one or more of a change in profile of at least one facial fiducial feature, a change in shadow of at least one facial fiducial feature, or a relative spatial change between at least two facial fiducial features, as outlined above.

It is again noted that the feature analyzer 144 is configured to distinguish between a photograph of an individual and the actual individual. Particularly, because a photograph of an individual is generally flat and has no depth, the feature analyzer 144 may distinguish between adjustments in features captured from the photograph as compared to adjustments to features captured from the actual individual. In various embodiments, the feature analyzer 144 may be configured to distinguish between a photograph of an individual and the actual individual with reference to feature data stored in the feature data 122 and/or based on a comparison of multiple response images. In certain aspects and embodiments, the feature analyzer 144 may be configured to compare a response image (or one or more pixels of the response image) captured by the image sensor 156 with a set of expected adjustments stored in the feature data 122 to determine whether adjustments to facial fiducial features correspond to one or more requests. Additionally or alternatively, the feature analyzer 144 may be configured to compare two response images (or one or more pixels of the two response images) to determine whether adjustments to facial fiducial features among the two response images correspond to one or more requests.

Figure 5:
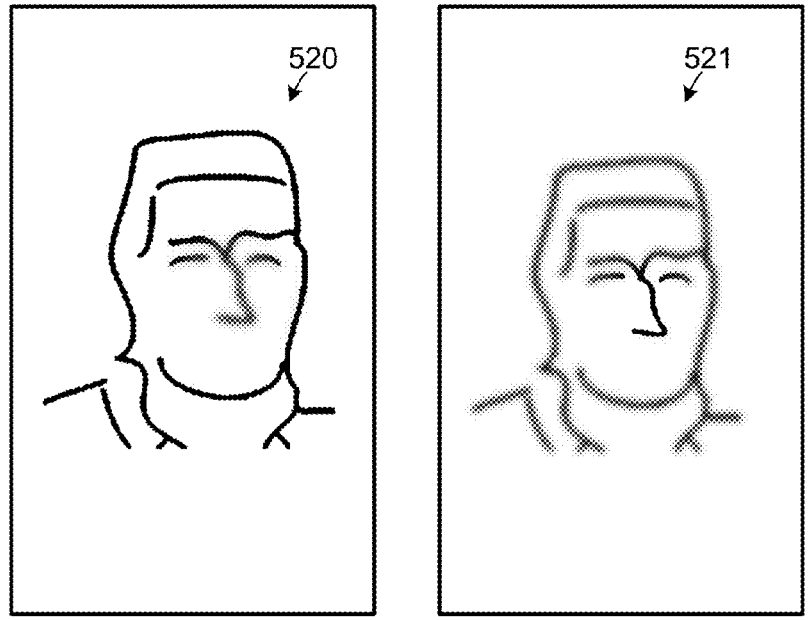
FIG. 5 illustrates example adjusted images captured using the computing device in FIG. 1 according to aspects of the embodiments described herein.

Before turning to FIG. 5, it is noted that the requests for responses 310-312 in FIGS. 3 and 410-412 in FIG. 4 are provided by way of example and not limitation. Other requests associated with other responses are within the scope of the embodiments. For example, requests to move the computing device 110 in other directions or angles are within the scope of the embodiments. Similarly, requests for the user 180 to turn or move (e.g., turn face to right, turn face to left, head up, head down, etc.) are within the scope of the embodiments.

FIG. 5 illustrates example adjusted images 520 and 521 captured using the computing device 110 in FIG. 1 according to aspects of the embodiments described herein. With reference to FIG. 5, it is noted that the access challenge engine 144 (FIG. 1) may be further configured to adjust an attribute of image capture. In turn, the access challenge engine 144 may direct the imaging system 150 to capture, with the image sensor 156, an adjusted image after the attribute of image capture is adjusted. In various embodiments, the attribute of image capture adjusted by the access challenge engine 142 may include at least one of a focus depth (e.g., using the optical system 152), flash activity (e.g., using the flash 154), flash intensity (e.g., using the flash 154), broad light activity (e.g., using a display of the computing device 110), broad light intensity (e.g., using a display of the computing device 110), or a color of broad light (e.g., using a display of the computing device 110).

Referring again to the example adjusted images 520 and 521 in FIG. 5, it is noted that, in the adjusted image 520, the point of focus or focus depth is beyond the nose of the user 180. In contrast, in the adjusted image 521, the point of focus or focus depth is at the nose of the user 180. Before capturing each of the adjusted images 520 and 521, the access challenge engine 144 may be configured to adjust the optical system 152 to a small aperture setting and adjust the focus point depth to different areas, for example. By comparing the adjusted images 520 and 521, the feature analyzer 144 may determine whether the subject being imaged has depth (e.g., tip of nose extending out from face, forehead, etc.). In doing so, the feature analyzer 144 may distinguish between a photograph of the user 180 and the user 180 himself, because a photograph would exhibit no depth. In other words, as compared to the example adjusted images 520 and 521 illustrated in FIG. 5, which exhibit variations in focus (e.g., nose vs. forehead) over different focus points, images of a photograph would be expected to exhibit no variations. In other words, either all or none of the image would be focused based on adjustments to the point of focus.

In other aspects, the attribute of image capture adjusted by the access challenge engine 142 may include flash activity (e.g., using the flash 154), flash intensity (e.g., using the flash 154), broad light activity (e.g., using a display of the computing device 110), broad light intensity (e.g., using a display of the computing device 110), or a color of broad light (e.g., using a display of the computing device 110). More particularly, by varying flash activity, the access challenge engine 142 may test the response of the skin or skin tone of the user 180 to the use of the flash 154 (FIG. 1). In this context, it is noted that the response of the skin or skin tone of the user 180 to light or changes in intensity of light from the flash 154 may differ from that of a photograph. Similarly, by varying a broad light cast from a display of the computing device 110, for example, the access challenge engine 142 may test the response of the skin or skin tone of the user 180 to broad light. Here, it is noted that the access challenge engine 142 may direct the display of the computing device 110 to display a full screen of white pixels at any suitable intensity as a broad light. Again, the response of the skin or skin tone of the user 180 to changes in the broad light may differ from that of a photograph. The challenge engine 142 may also direct the display of the computing device 110 to display a full screen of any color or combination of colors of pixels at any suitable intensity as the broad light, and analyze the response of the skin or skin tone of the user 180 to the color or combination of colors. As another alternative, the access challenge engine 142 may direct the display of the computing device 110 to display a grid of illuminated lines of white pixels, for example. In this case, the lines may project a grid onto the face of the user 180, and the grid may curve along with the depth of the facial features of the user 180. Such curvature would not be exhibited if an image was captured from a photograph.

Figure 6:
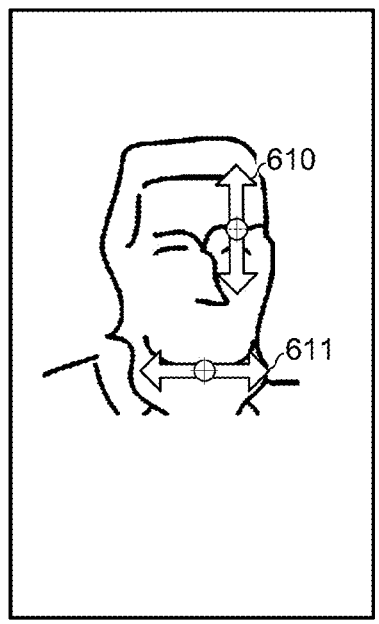
FIG. 6 illustrates examples of requests for responses displayed by the computing device in FIG. 1 according to aspects of the embodiments described herein.

FIG. 6 illustrates examples of requests for responses 610 and 611 displayed by the computing device 110 in FIG. 1 according to aspects of the embodiments described herein. As alternatives to the requests for responses 310-312 in FIG. 3 or 410-412 in FIG. 4, the requests for responses 610 and 611 are associated with a request to move or contort a particular facial fiducial feature of the user 180. For example, the request for the response 611 may be associated with a request for the user 180 to move his or her chin to the right or left, and the request for the response 612 may be associated with a request to the user 180 to move his or her eyebrow up or down. Response images captured in connection with the requests for responses 610 and 611 may include relative spatial changes between facial fiducial features of the user 180. In turn, the feature analyzer 144 may identify the relative spatial changes and, accordingly, confirm that the response images have been captured from the user 180 himself and not from a photograph of the user 180.

It should be appreciated that the requests for responses 610 and 611 in FIG. 6 are provided as representative examples only. While the requests for responses 610 and 611 are illustrated in FIG. 6 as having a certain form (e.g., double arrows and crosshairs) and provided on a display screen of the computing device 110, other types of requests for responses are within the scope of the embodiments. In other words, the requests for responses 610 and 611 may be displayed or provided to the user 180 using other representative shapes or designs, using text instructions, audibly, or using haptic feedback, among other ways. Further, requests for responses, as described herein, may include a request for the user 180 to blink his or her right, left, or both eyes, to open or close his or her mouth, pucker his or her lips, etc.

Figure 7:
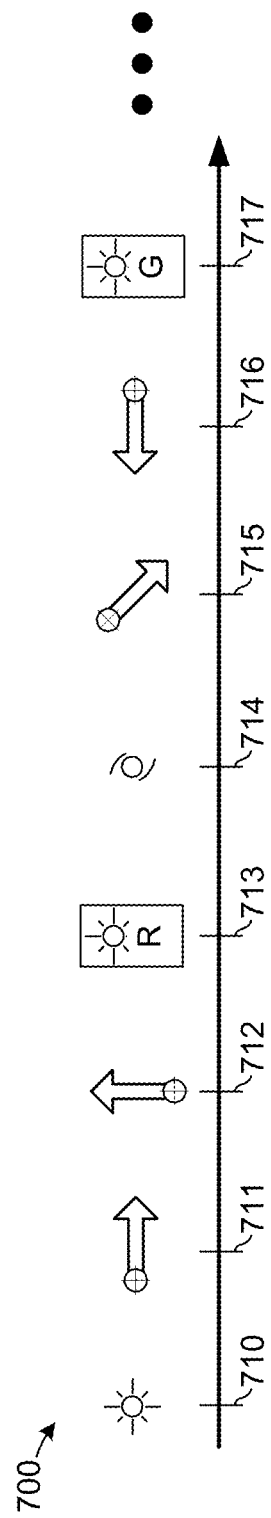
FIG. 7 illustrates an example sequence of successive requests for respective responses and adjustments issued by the computing device in FIG. 1 according to aspects of the embodiments described herein.

FIG. 7 illustrates an example sequence 700 of successive requests for respective responses and adjustments issued by the computing device 110 in FIG. 1 according to aspects of the embodiments described herein. The example sequence 700 includes requests and adjustments 710-717. More particularly, from left to right in FIG. 7, the sequence 700 includes a flash adjustment 710, a request 711 to turn the computing device 110 to the right, a request 712 to tilt or move the computing device 110 back, a red broad light adjustment 713, a focus point adjustment 714, a request 715 to turn the computing device 110 down at an angle, a request 716 to turn the computing device 110 to the left, and a green broad light adjustment 717. In certain aspects of the embodiments, the sequence 700 may be generated randomly by the access challenge engine 142 (FIG. 1). Further, the sequence 700 may include any number of requests for responses and/or adjustments, depending upon the level of strength in access control required by the access service 140.

Between each of the requests and adjustments 710-717, the access challenge engine 142 may direct the imaging system 150 to capture a respective response image (e.g., a "still image"), where each respective response image includes a corresponding adjustment to one or more facial fiducial features of the user 180. The access challenge engine 142 may also direct the imaging system 150 to capture a several still images between or among the requests and adjustments 710-717, where one or more of the still images include adjustments to features of the user 180. Additionally or alternatively, the access challenge engine 142 may direct the imaging system 150 to capture video or video and audio during or overlapping with the requests and adjustments 710-717. Because the sequence 700 is generated randomly by the access challenge engine 142 for each access to the computing device 110, it is unlikely that the sequence of adjustment to the facial fiducial features of the user 180 could be expected or anticipated beforehand. Thus, it is unlikely that a video including the sequence of adjustment according to the sequence 700 could be captured and replayed in an effort to circumvent the access control provided by the access service 140. By referencing the respective response images among each other or with the feature data 122, for example, the feature analyzer 144 may determine whether at least one corresponding adjustment to the facial fiducial features in the respective response images corresponds with at least one of the plurality of successive requests and adjustments 710-717. If the feature analyzer 144 determines that the adjustments in the respective response images are consistent with the requests and adjustments 710-717, the access service 140 may permit access to the computing device 110.

Figure 8:
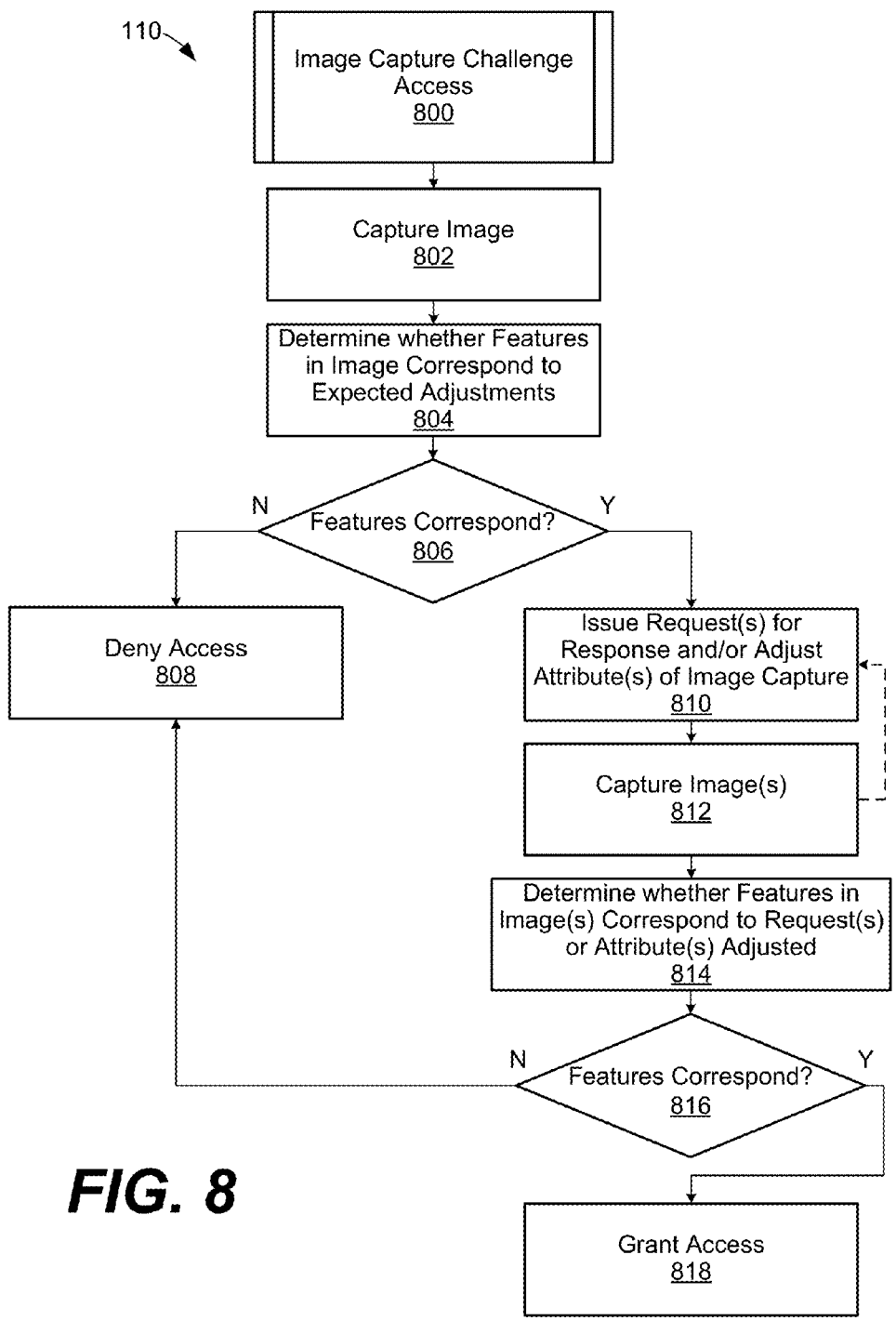
FIG. 8 illustrates an example image capture challenge access process performed by the computing environment in FIG. 1 according to aspects of the embodiments described herein.

FIG. 8 illustrates an example image capture challenge access process 800 performed by the computing environment 110 in FIG. 1 according to aspects of the embodiments described herein. Although the image capture challenge access process 800 is described below as being performed by the computing device 110 in FIG. 1, it should be appreciated that the process 800 may be performed by other computing devices and/or systems.

At reference numeral 802, the process 800 includes capturing an image including a facial fiducial feature. For example, before permitting access to the computing device 110 by the user 180, the access challenge engine 142 of the access service 140 may direct the imaging system 150 to capture an image of the user 180 using the imaging system 150. The image of the user 180 may include one or more facial fiducial features as described above with reference to FIG. 2, for example. At reference numeral 804, the process 800 includes determining whether the one or more facial fiducial features correspond to an expected set of features. That is, consistent with the description above, at reference numeral 804, the feature analyzer 144 of the access service 140 may determine whether the facial fiducial features in the image captured at reference numeral 802 correspond to an expected set of features stored in the feature data 122.

At reference numeral 806, the process 800 includes a branch to reference numeral 808 if, at reference numeral 806, the facial fiducial features do not correspond to the expected set of features. In this case, the access service 140 may deny access to the computing device 110 by the user 180. Alternatively, if, at reference numeral 806, the facial fiducial features correspond to the expected set of features, the process branches to reference numeral 810.

At reference numeral 810, the process 800 includes issuing a request for a response and/or adjusting an attribute of image capture. For example, the access service 140 may issue a request for a response to the user 180 or adjust an attribute of image capture using the imaging system 150, as described above. In various embodiments, reference numeral 810 may include the access service 140 issuing one request for a response, issuing first and second requests for responses, or issuing a plurality of successive requests for respective responses. Generally, the one or more requests issued at reference numeral 810 may include any of the requests described herein or variants thereof, such as the requests 310-312 in FIG. 3, the requests 410-412 in FIG. 4, the requests 610 and 611 in FIG. 6, or the successive requests in the sequence 700 in FIG. 7. Additionally or alternatively, reference numeral 810 may include adjusting one or more attributes of image capture as described above with reference to FIGS. 5 and 7.

After issuing the one or more requests and/or adjusting one or more attributes of image capture at reference numeral 810, the process 800 includes capturing a response image and/or an adjusted image at reference 812. In certain embodiments, when reference numeral 810 includes issuing a plurality of successive requests for respective responses, the process 800 may include capturing a respective response image for individual ones of the respective responses (or adjusted image capture attributes) at reference numeral 812. In this case, each respective response image may include a corresponding adjustment to facial fiducial features. The capturing at reference numeral 812 may be performed by the imaging system 150 as directed by the access challenge engine 142 of the access service 140, for example.

At reference numeral 814, the process 800 includes determining whether the adjustment to the facial fiducial features captured at reference numeral 812 corresponds to the request issued at reference numeral 810. In certain embodiments, when reference numeral 810 includes issuing a plurality of successive requests for respective responses, reference numeral 814 may include determining whether at least one corresponding adjustment to the facial fiducial features captured in reference numeral 812 corresponds with at least one of the plurality of successive requests at reference numeral 810. As described above, the determination of whether at least one corresponding adjustment to the facial fiducial features captured in reference numeral 812 corresponds with at least one of the plurality of successive requests at reference numeral 810 may be performed by the feature analyzer 144 of the access service 140.

In some embodiments, the determining at reference numeral 814 may include calculating a difference between two images captured at different times. To this end, the determining may include assessing a likelihood that the two images were captured from a photograph of an individual rather than captured from the individual himself. In this context, the feature analyzer 144 may calculate or evaluate a difference or similarity between the first and second images to determine whether the authorization mechanism of the access service 140 has been satisfied. Such differences or similarities may be identified by inspecting the facial features of an individual among the images. Here, as noted above, the features may include, but are not limited to, the individual's chin, nose, eyes, eyebrows, skin coloring, eye coloring, hair coloring, etc., any combination thereof, relative positions thereof (e.g., the center-to-center distance of the individual's pupils), etc. Further, in relatively high security-sensitive embodiments, a higher correlation threshold may be relied upon by the feature analyzer 144. On the other hand, in relatively low security-sensitive embodiments, a lower correlation threshold may be relied upon by the feature analyzer 144.

At reference numeral 816, the process 800 includes a branch to reference numeral 808 or reference numeral 816 depending or based on whether the adjustment to the facial fiducial features captured at reference numeral 812 corresponds to the request at reference numeral 810. In certain embodiments, when reference numeral 810 includes issuing a plurality of successive requests for respective responses, the process 800 includes a branch to reference numeral 808 if, at reference numeral 816, at least one corresponding adjustment to the facial fiducial features captured at reference numeral 812 does not correspond to at least one of the plurality of successive requests at reference numeral 810. In this case, the access service 140 may deny access to the computing device 110 by the user 180. Alternatively, if, at reference numeral 816, at least one corresponding adjustment to the facial fiducial features captured at reference numeral 812 does correspond to at least one of the plurality of successive requests at reference numeral 810, the process branches to reference numeral 818.

At reference numeral 818, the process 800 includes the access service 140 permitting access to the computing device 110 by the user 180. In other words, at reference numeral 818, the access service 140 may selectively enable access to the computing device 100 based on the image-based verifications at reference numerals 802, 804, 806, 810, 812, 814, 816, etc. Such image-based verifications are generally directed to a conclusion as to whether an individual is physically present when capturing the images at reference numerals 802 and 812, based on a certain threshold of differentiation of facial fiducial features between the images, for example. At reference numeral 818, access may be provided to a particular feature or application of the computing device 110.

The image capture challenge access process 800 may be relied upon to distinguish between a photograph of an individual and the actual individual. Particularly, because a photograph of an individual is generally flat and has no depth, the process 800 may distinguish between adjustments in features captured from a photograph as compared to adjustments to features captured from the actual individual. In various embodiments, the process 800 may distinguish between a photograph of an individual and the actual individual with reference to feature data stored in the feature data 122 and/or based on a comparison of multiple response images as described herein. In certain aspects and embodiments, the process 800 may compare a response (or adjusted) image (or one or more pixels of the response or adjusted image) with a set of expected adjustments stored in the feature data 122 to determine whether the adjustments to facial fiducial features correspond to one or more requests or adjustments. Additionally or alternatively, the feature analyzer 144 may be configured to compare two response (or adjusted) images to determine whether difference among them correspond to an expected changed based on one or more requests.

Figure 9:
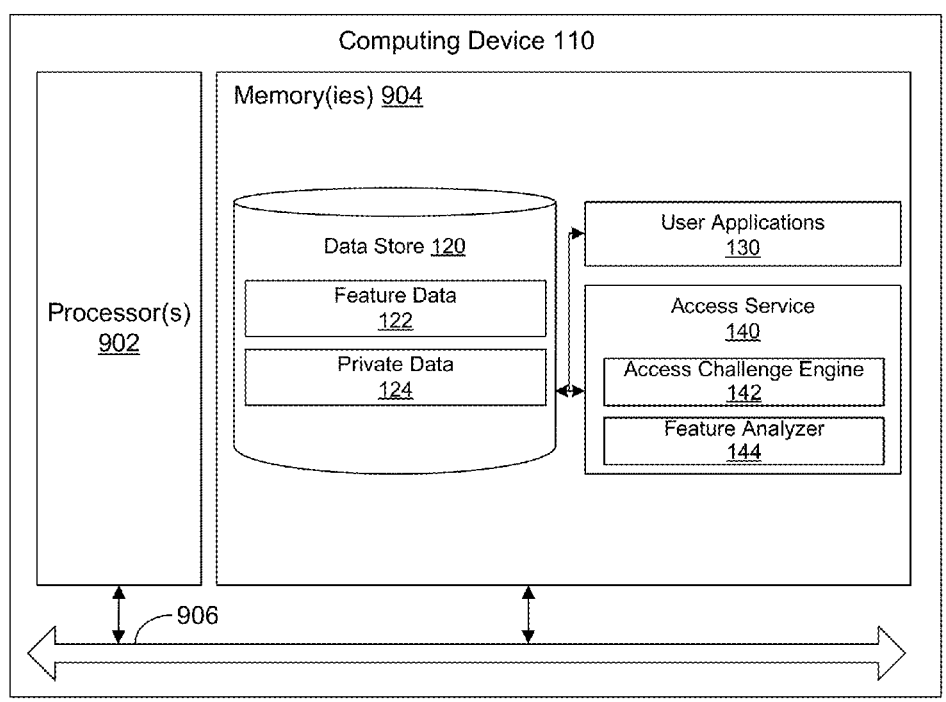
FIG. 9 illustrates an example schematic block diagram of the computing device in FIG. 1 according to aspects of the embodiments described herein.

FIG. 9 illustrates an example schematic block diagram of the computing device 110 in FIG. 1 according to various embodiments of the present disclosure. The computing device 110 includes at least one processor 902 and at least one memory 904, both of which are electrically and communicatively coupled to a local interface 906. The local interface 906 may be embodied as a data bus with an accompanying address/control bus or other bus structure as can be appreciated, for example. Also, the processor 902 may be representative of multiple processors 902 and/or multiple processor cores and the memory 904 may be representative of multiple memories that operate in parallel, respectively, or in combination. Thus, the local interface 906 may be an appropriate network or bus that facilitates communication between multiple processors 902 and multiple memories 904.

In various embodiments, the memory 904 stores data and software or executable-code components executable by the processor 902. For example, the memory 904 may store executable-code components associated with the user applications 130 and the access service 140, for execution by the processor 902. It should be appreciated, however, that the memory 904 may store other executable-code components for execution by the processor 902. For example, an operating system may be stored in the memory 904 for execution by the processor 902. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages. The memory 904 may also store data such as the feature data 122 and the private data 124.

As discussed above, in various embodiments, the memory 904 stores software for execution by the processor 902. In this respect, the terms "executable" or "for execution" refer to software forms that can ultimately be run or executed by the processor 902, whether in source, object, machine, or other form. Examples of executable programs include, for example, a compiled program that can be translated into a machine code format and loaded into a random access portion of the memory 904 and executed by the processor 902, source code that can be expressed in an object code format and loaded into a random access portion of the memory 904 and executed by the processor 902, or source code that can be interpreted by another executable program to generate instructions in a random access portion of the memory 904 and executed by the processor 902, etc. An executable program may be stored in any portion or component of the memory 904 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component. In various embodiments, the memory 904 may include both volatile and nonvolatile memory and data storage components.

As discussed above, the access service 140 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagrams of FIG. 8 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 902. The machine code may be converted from the source code, etc. Further, each block may represent, or be connected with, a circuit or a number of interconnected circuits to implement a certain logical function or process step.

Although the flowchart or process diagrams of FIG. 8 illustrate a specific order, it is understood that the order may differ from that which is depicted. For example, an order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the user applications 130 and the access service 140 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 8. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the access service 140, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing device 110. Additionally, it should be appreciated that terms such as "application," "service," "system," "engine," "module," and so on may be used interchangeably and are not intended to be limiting.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device, the program code being configured to cause the at least one computing device to at least:

issue a request for a user of the at least one computing device to change a physical orientation of the at least one computing device;

detect a change of the physical orientation of the at least one computing device based at least in part on a physical orientation of the at least one computing device at a first instance and a physical orientation of the at least one computing device at a second instance;

capture, during the first instance, with an image sensor, a first reference image including a first plurality of facial fiducial features and a first field of view, the first reference image being captured based at least in part on a focal point of the image sensor and an aperture setting associated with the image sensor, and the first reference image comprising a first focus value associated with each of a plurality of positions within the first field of view;

capture, during the second instance, with the image sensor, a second reference image including a second plurality of facial fiducial features and a second field of view, the second reference image being captured based at least in part on the focal point of the image sensor and an adjustment to the aperture setting associated with the image sensor, the second reference image comprising a second focus value associated with each of a plurality of positions within the second field of view;

determine that the user of the at least one computing device is authorized to access at least one function of the at least one computing device based at least in part on:

a comparison between the first plurality of facial fiducial features, the second facial fiducial features, and an expected set of features, the expected set of features being based on at least one of a plurality of facial fiducial features of the user of the at least one computing device, the physical orientation of the at least one computing device at the first instance, the physical orientation of the at least one computing device at the second instance, the first field of view, or the second field of view; and, a determination that a difference between the first focus value associated with each of the plurality of positions within the first field of view and the second focus value associated with each of the plurality of positions within the second field of view is greater than a threshold deviation; and, enable access to the at least one function of the at least one computing device.

2. The non-transitory computer-readable medium of claim 1, wherein the request for the user of the at least one computing device to change the physical orientation of the at least one computing device comprises a request for the user of the at least one computing device to move the at least one computing device in a particular direction.

3. The non-transitory computer-readable medium of claim 1, wherein the request for the user of the at least one computing device to change the physical orientation of the at least one computing device comprises a request for the user of the at least one computing device to tilt the at least one computing device along a particular axis or to a particular angle.

4. The non-transitory computer-readable medium of claim 1, wherein the program code is configured to cause the at least one computing device to:
 determine that a difference between the first focus value associated with each of the plurality of positions within the first field of view and the second focus value associated with each of the plurality of positions within the second field of view is less than or equal to a threshold deviation; and,
 disable access to the at least one function of the at least one computing device.

5. The non-transitory computer-readable medium of claim 1, wherein the threshold deviation comprises a value of zero.

6. A method for controlling access to a computing device, comprising:
 issuing a request for a user of the computing device to move the computing device;
 detecting a movement of the computing device based at least in part on a location of the computing device at a first instance and a location of the computing device at a second instance;
 capturing, during the first instance, a first reference image that includes a first plurality of facial fiducial features and a first field of view, the first reference image being captured based at least in part on a focal point of the image sensor and an aperture setting associated with the image sensor, and the first reference image comprising a first focus value associated with each of a plurality of positions within the first field of view;
 capturing, during the second instance, a second reference image that includes a second plurality of facial fiducial features and a second field of view, the second reference image being captured based at least in part on the focal point of the image sensor and an adjustment to the aperture setting associated with the image sensor, the second reference image comprising a second focus value associated with each of the plurality of positions within the second field of view;
 determining that the user of the computing device is authorized to access the computing device based at least in part on:
  a comparison between the facial fiducial features of the first reference image, the facial fiducial features of the second reference image, and an expected set of features, the expected set of features being based on at least one of a plurality of facial fiducial features of the user of the at least one computing device, the physical orientation of the at least one computing device at the first instance, the physical orientation of the at least one computing device at the second instance, the first field of view, or the second field of view; and,
  a determination that a difference between the first focus value associated with each of the plurality of positions within the first field of view and the second focus value associated with each of the plurality of positions within the second field of view is greater than a threshold deviation; and,
 selectively enabling access to the computing device.

7. The method of claim 6, wherein selectively enabling is specific to providing access to a particular feature or application of the computing device.

8. The method of claim 6, further comprising:
 determining that the user of the computing device is not authorized to access the computing device; and,
 disabling access to the at least one function of the computing device.

9. The method of claim 6, wherein the threshold deviation comprises a value of zero.

10. A system, comprising:
 a processor; and
 a memory comprising, which when executed by the processor, causes the processor to at least:
 issue a request for a user of a computing device to tilt the computing device;
 detect a tilting of the computing device based at least in part on a physical orientation of the computing device at a first instance and a physical orientation of the computing device at a second instance;
 capture, during the first instance, with an image sensor of the computing device, a first reference image including a first plurality of facial fiducial features and a first field of view, the first reference image being captured based at least in part on a focal point of the image sensor and an aperture setting associated with the image sensor, and the first reference image comprising a first focus value associated with each of a plurality of positions within the first field of view;
 capture, during the second instance, with the image sensor of the computing device, a second reference image including a second plurality of facial fiducial features and a second field of view, the second reference image being captured based at least in part on the focal point of the image sensor and an adjustment to the aperture setting associated with the image sensor, the second reference image comprising a second focus value associated with each of a plurality of positions within the second field of view;
 determine that the user of the computing device is authorized to access at least one function of the computing device based at least in part on:
  a comparison between the first plurality of facial fiducial features, the second plurality of facial fiducial features, and an expected set of features, the expected set of features being based on at least one of a plurality of facial fiducial features of the user of the at least one computing device, the physical orientation of the at least one computing device at the first instance, the physical orientation of the at least one computing device at the second instance, the first field of view, or the second field of view;
  a determination that a difference between the first focus value associated with each of the plurality of positions within the first field of view and the second focus value associated with each of the plurality of positions within the second field of view is greater than a threshold deviation; and,
 selectively permit access to a feature or application of the computing device.

11. The system of claim 10, wherein the physical orientation of the computing device at the first instance comprises an angle at which the computing device is tilted at the first instance, and the physical orientation of the computing device at the second instance.

12. The system of claim 11, wherein the position of the computing device at the first instance further comprises an axis along which the computing device is tilted at the first instance, and the position of the computing device at the second instance.

13. The system of claim 10, wherein;
the image sensor comprises at least one of an infrared image sensor sensitive to infrared light or a thermal image sensor sensitive to thermal energy;
the infrared image sensor differentiates between the user and an image of the user by capturing an image including an indication of a source of infrared energy; and
the thermal image sensor differentiates between the user and the image of the user by capturing an image including an indication of a source of heat.

14. The system of claim 10, wherein the program code is configured to cause the processor to at least:
determine that the user of the computing device is not authorized to access the computing device; and,
disable access to the at least one function of the computing device.

15. The system of claim 10, wherein the threshold deviation comprises a value of zero.

16. A non-transitory computer-readable medium embodying program code executable in at least one computing device, the program code being configured to cause the at least one computing device to at least:
issue a request for a user of the at least one computing device to change a physical orientation of the at least one computing device;
detect a change of the physical orientation of the at least one computing device based at least in part on a physical orientation of the at least one computing device at a first instance and a physical orientation of the at least one computing device at a second instance;
capture, during the first instance, with an image sensor, a first reference image including a first plurality of facial fiducial features and a first field of view, the first reference image being captured based at least in part on a focal point of the image sensor and an aperture setting associated with the image sensor, and the first reference image comprising a first focus value associated with each of a plurality of positions within the first field of view;
capture, during the second instance, with the image sensor, a second reference image including a second plurality of facial fiducial features and a second field of view, the second reference image being captured based at least in part on the focal point of the image sensor and an adjustment to the aperture setting associated with the image sensor, the second reference image comprising a second focus value associated with each of the plurality of positions within the second field of view;
determine that the user of the at least one computing device is not authorized to access a feature or an application of the at least one computing device based at least in part on:
a comparison between the first plurality of facial fiducial features, the second plurality of facial fiducial features, and an expected set of features, the expected set of features being based on at least one of a plurality of facial fiducial features of the user of the at least one computing device, the physical orientation of the at least one computing device at the first instance, the physical orientation of the at least one computing device at the second instance, the first field of view, or the second field of view; and,
a determination that a difference between the first focus value associated with each of the plurality of positions within the first field of view and the second focus value associated with each of the plurality of positions within the field of view is less than or equal to a threshold deviation; and,
selectively disable access to the feature or the application of the at least one computing device.

17. The non-transitory computer-readable medium of claim 16, wherein the physical orientation of the at least one computing device at the first instance comprises at least one of: a location of the at least one computing device at the first instance, or an angle of the at least one computing device at the first instance.

18. The non-transitory computer-readable medium of claim 17, wherein the physical orientation of the at least one computing device at the second instance comprises at least one of: a location of the at least one computing device at the second instance, or an angle of the at least one computing device at the second instance.

19. The non-transitory computer-readable medium of claim 16, wherein the program code is configured to cause the at least one computing device to project a plurality of colors of broad light from a display of the at least one computing device during the capture of at least one of the first reference image or the second reference image.

20. The non-transitory computer-readable medium of claim 16, wherein the threshold deviation comprises a value of zero.

* * * * *